(12) United States Patent
Wojciechowski et al.

(10) Patent No.: US 6,592,311 B2
(45) Date of Patent: Jul. 15, 2003

(54) DOUBLE-ENDED SELF-ATTACHING STUD

(75) Inventors: Stanley E. Wojciechowski, Canton, MI (US); Michael J. McShane, Bloomfield Hills, MI (US)

(73) Assignee: FabriSteel Products, Inc., Taylor, MI (US)

( * ) Notice: Subject to any disclaimer, the term of this patent is extended or adjusted under 35 U.S.C. 154(b) by 0 days.

(21) Appl. No.: 09/909,260

(22) Filed: Jul. 19, 2001

(65) Prior Publication Data

US 2003/0017025 A1 Jan. 23, 2003

(51) Int. Cl.⁷ ................................................ F16B 39/00
(52) U.S. Cl. ........................ 411/107; 411/180; 411/389
(58) Field of Search ............................... 411/107, 180, 411/181, 183, 389

(56) References Cited

U.S. PATENT DOCUMENTS

| | | | | |
|---|---|---|---|---|
| 2,741,289 A | * | 4/1956 | Grow | |
| 3,058,211 A | * | 10/1962 | Axtell | |
| 3,127,919 A | * | 4/1964 | Swanstrom | |
| 3,299,500 A | * | 1/1967 | Double | |
| 3,367,685 A | * | 2/1968 | Church | |
| 3,535,678 A | * | 10/1970 | Gulistan | |
| 5,423,645 A | * | 6/1995 | Muller | |

* cited by examiner

*Primary Examiner*—Flemming Saether
(74) *Attorney, Agent, or Firm*—Howard & Howard

(57) ABSTRACT

A stud for installation in a host panel and for fastening a component to the host panel includes at least one shaft having a longitudinal axis. An annular flange extends radially from the shaft at a substantially right angle with respect to the longitudinal axis. A shoulder for engagement with the host panel has a top adjacent to the shaft and a base adjacent to the flange. The shoulder extends radially from the shaft wherein the shoulder and the flange define an undercut therebetween at the base of the shoulder such that a diameter of the shoulder is smaller at the base than at the top. At least one anti-rotation tab is located intermediate between the shoulder top and the flange, and is aligned for engagement with the host panel.

10 Claims, 3 Drawing Sheets

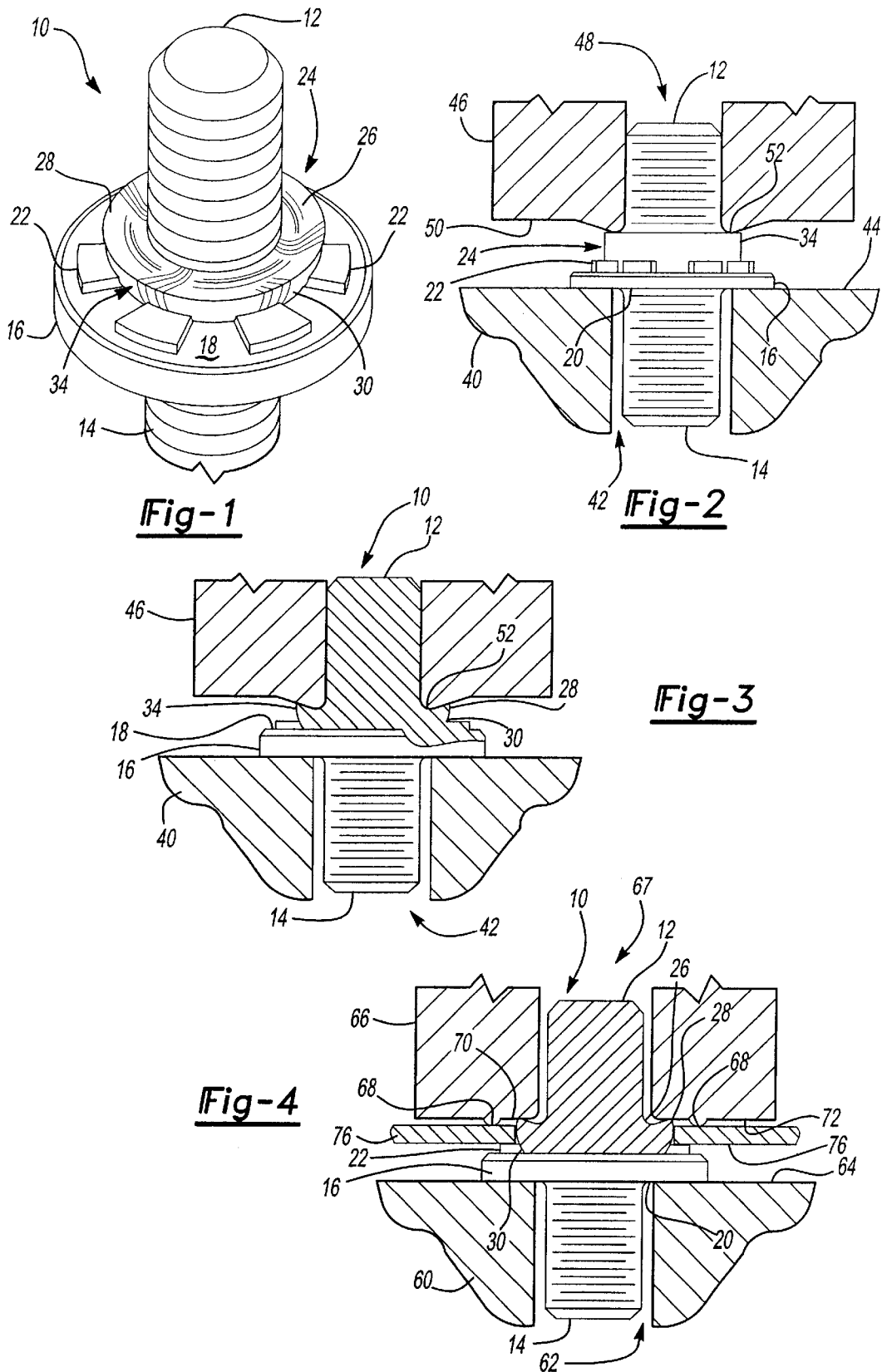

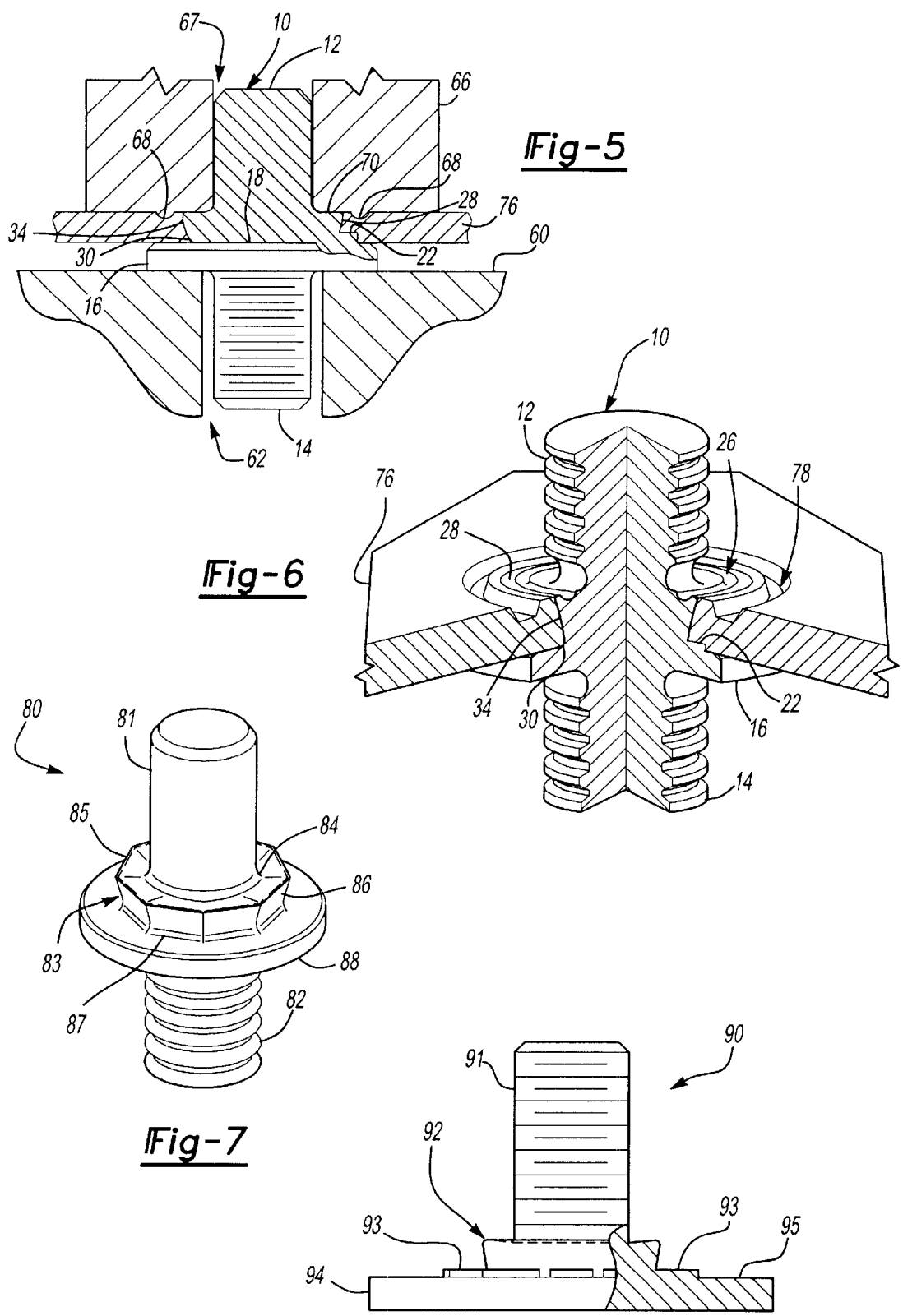

DOUBLE-ENDED SELF-ATTACHING STUD

TECHNICAL FIELD

The invention relates to a fastener. The invention is specifically related to a self-attaching double or single ended stud.

BACKGROUND OF INVENTION

Studs are used by the automotive industry to assemble vehicles in which many components of various kinds are attached to metal plates or panels. For example studs are used to attach lamps, brackets, modules, and sheet metal parts to the vehicle. When such parts are attached a nut is placed over the end of the installed stud and the nut is tightened with rotating tools such as an air or electric torque gun, set to the specified torque values. The self-attaching stud must therefore have the necessary and sufficient anti-torque or rotation resistance (the force that keeps the stud from rotating on the mating metal plate when the nut is tightened on the stud).

When self-attaching studs are being driven into a metal panel the studs may be continuously supplied to the installation tooling through an outlet of a supply device, such as a hopper. Studs are easily adapted to automatic feeding machines because of the large length to diameter ratio. The larger the ratio the more efficient the high-speed feeding operations become.

After a component is attached to the stud on the metal plate, external forces such as vibration and shear and tensile forces are applied to the joint (the stud and nut combination with the attached part). These forces act upon the stud from the pull through direction attempting to pull the studs from the metal plate in which they are attached. Therefore, the installed stud must have sufficient push out and pull out resistance. Previously, the only way to ensure a very high push out or pull out force was to weld the stud to the mating material. Earlier attempts to use double-ended studs that were not welded resulted in studs with very low push-in and push-out values. A low push-out value limits the number of applications in which the stud can be used, since a stud with a low push-out value can not attach parts of any significant amount of mass.

Thus, there is a need in the industry for a stud that can be attached by means other than welding where the stud also has a very high push-out force, and where the stud can be configured as either a single-ended stud or a double-ended stud.

SUMMARY OF THE INVENTION

One aspect of the present invention is a stud for installation in a host panel and for fastening a component to the host panel, which includes at least one shaft, having a longitudinal axis. An annular flange extends radially from the shaft at a substantially right angle with respect to the longitudinal axis. A shoulder for engagement with the host panel has a top adjacent to the shaft and a base adjacent to the flange. The shoulder extends radially from the shaft wherein the shoulder and the flange define an undercut therebetween at the base of the shoulder such that a diameter of the shoulder is smaller at the base than at the top. At least one anti-rotation tab is located intermediate between the shoulder top and the flange, and is aligned for engagement with the host panel.

Another aspect of the present invention is a double-ended stud for installation in a host panel and for fastening a component to the host panel wherein the double-ended stud includes a shaft having a longitudinal axis and a first and a second end. An annular flange coaxial to the shaft is positioned intermediate between the first and second ends of the shaft. A shoulder is positioned adjacent to a surface of the flange and is coaxial thereto wherein the shoulder has an outer peripheral face. The peripheral shoulder face and the flange surface define an acute angle therebetween. At least one anti-rotation tab extends from one of either the flange surface or the shoulder's outer peripheral face.

Yet another aspect of the present invention is a method for installing a double-ended stud in a host panel aperture wherein the stud has an annular flange with anti-rotation tabs and further includes a shoulder with a crown and a face with a back angled portion. The method for installation comprises the steps of supporting one end of the stud and the stud flange with an installation fixture and then placing an installation punch over the opposite end of the stud wherein the installation punch has a face portion bearing on the shoulder crown and an annular protrusion bearing on the panel area proximate to the panel aperture receiving the stud. Next, a force is applied by the punch in a direction toward the installation fixture and deforming the panel material around the anti-rotation tabs. The applying force further causing the flowing of panel material that defines the panel aperture into the back angled portion of the shoulder and deflecting the shoulder crown radially outward to engage the panel at the periphery of the panel aperture.

These and other advantages of the invention will be further understood and appreciated by those skilled in the art by reference to the following written specification, claims and appended drawings.

BRIEF DESCRIPTION OF THE DRAWINGS

FIG. 1 is a perspective view of a double-ended stud embodying the present invention.

FIG. 2 is an elevational view of a stud at the beginning of the final step of the stud forming process with the header tool (in section) partially advanced and beginning to form the back angled portion of the shoulder.

FIG. 3 is an elevational view of a stud at the final step of the stud forming process with the header tool (in section) fully advanced and the back angled shoulder fully formed.

FIG. 4, is an elevational view of a stud and installation punch in partial cross-section showing the finished stud inserted in a mating metal panel with the installation punch ready to deform the mating panel into the back angled portion of the stud.

FIG. 5 is an elevational view of the stud and installation punch in partial cross-section showing the punch having deformed the mating metal panel into the back angled portion of the stud.

FIG. 6, is an elevational view in partial cross-section of a stud installed in a mating panel illustrating the flow of panel metal into the back angled portion of the stud and into engagement with the anti-rotation feature of the stud.

FIG. 7 is a perspective view of an alternate embodiment of the stud wherein the back angled shoulder of the stud comprises a multi-sided polygon.

FIG. 8 shows an alternate embodiment of a single ended self-attaching stud.

DESCRIPTION OF THE PREFERRED EMBODIMENT

Figure 9:
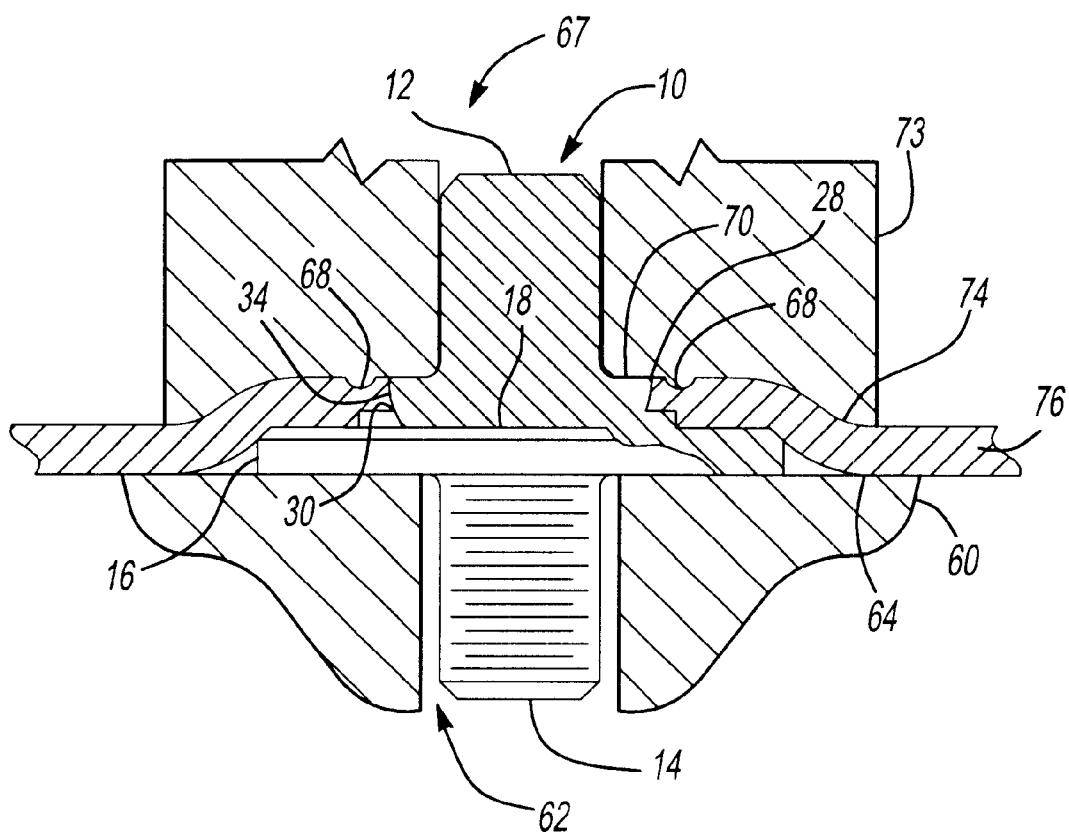
FIG. 9 shows an elevation view of an installed stud similar to FIG. 5 wherein the installation punch deforms the host panel to be flush with the flange bottom.

For purposes of description herein, the terms "upper", "lower", "right", "left", "rear", "front", "vertical", "horizontal", and derivatives thereof shall relate to the invention as oriented in FIGS. 1 and 2. However, it is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concept defined in the appended claims. Hence, specific dimensions and other physical characteristics relating to the embodiments disclosed herein are not to be considered as limiting, unless the claims expressly state otherwise.

Turning to the drawings, FIG. 1 shows a double-ended stud 10, which is one of the preferred embodiments of the present invention, and illustrates its various components.

Stud 10 in its preferred embodiment comprises a threaded upper shaft 12 and a co-axial lower threaded shaft 14. An annular flange 16 is positioned between shafts 12 and 14 and extends radially therefrom at a substantially right angle to the longitudinal axis of shafts 12 and 14. A shoulder 24 is adjacent the upper surface 18 of flange 16. Shoulder 24 extends radially from upper threaded shaft 12 wherein a top portion of the shoulder has a recess 26 immediately adjacent shaft 12 and a crown portion 28 at its outer periphery. The base of shoulder 24 is adjacent to the upper surface 18 of flange 16. Face 34 of shoulder 24 and upper surface 18 of flange 16 define an undercut 30 such that the diameter of shoulder 24 is smaller at its base than at the top or crown portion 28. At least one anti-rotation tab 22 protrudes into the area between crown portion 28 and upper surface 18 of flange 16.

The self-attaching portion of the stud 10, comprising shoulder 24, anti-rotation tabs 22, and flange 16 is formed in a multi-step process. Typically, there are three to five steps or stations, more commonly called "blows" required in the heading process to fully form the attaching portion of the stud. The initial steps in the heading process are well known in the art and, while described herein, are not shown in the figures. Initially, coiled wire is fed into the heading machine and the wire is cut to the required length in and positioned in the first die. The die then begins to form annular flange 16, and shoulder 24 above annular flange 16. The shoulder 24 may be formed in a variety of shapes such as circular, square, octagonal, or any other polygonal shape with the preferred embodiment being a circular shoulder 24 as shown in FIG. 1. In the later stages of the heading operation anti-rotation tabs 22 are partially formed on the top 18 of the annular flange 16. Anti-rotation tabs 22 can be formed as any geometric irregularity to prevent stud 10 from rotating in its host panel after installation described below. Each successive step or blow to the stud in the header moves progressively more metal towards the final shape of the stud.

FIGS. 2–3 illustrate the last station of the header process wherein a back angle between shoulder face 34 and top surface 18 of flange 16 is formed defining back angled portion 30 of the stud 10. In this operation the die 46 in the header tool has an aperture 48 into which is received upper shaft 12 of stud 10. Die 46 contains an annular nose 52 on the surface of the tool about the periphery of aperture 48. As the header tool advances it forces the annular nose 52 on the die to make contact with the top of shoulder 24 of the stud 10. The advancement of the tool creates pressure that is applied to the top 28 of the shoulder 24 and forces the top or crown 28 of the shoulder 24 radially outward from the center of the stud and also creates recessed portion 26. This forms the back angled portion 30 between the top surface 18 of the annular flange 16 and the top 28 of the shoulder 24.

The height of shoulder 24 required for a particular application depends on the thickness of material into which it is to be installed. The height dimension from upper surface 18 of flange 16 to crown 28 is slightly greater than the material thickness into which it is to be installed. Those skilled in the art will readily recognize that since there are specific standard gages of sheet material used in industry only a limited number of shoulder sizes need be produced to accommodate these standard gages.

Referring now to FIGS. 4–6, a stud 10 according to the preferred embodiment is shown for installation in mating panel 76. As illustrated in FIG. 4, flange 16 of stud 10 rests on an upper surface 64 of installation fixture 60 such that lower threaded shaft 14 extends into or is received by aperture 62. Mating panel 76 rests on top of anti-rotation tabs 22 on the upper surface 18 of flange 16. It will also be noted that the crown portion 28 of shoulder 24 extends above an upper surface of mating panel 76. An installation punch 66 having an aperture 67 therethrough is lowered over stud 10 such that upper threaded shaft 12 is received into aperture 67. The bottom portion of installation punch 66 has an inner bottom surface 70 immediately adjacent the periphery of aperture 67 and also has an annular protrusion 68 extending below inner bottom surface 70. The arrangement of crown 28, the upper surface of mating panel 76, inner bottom surface 70, and annular protrusion 68 is such that annular protrusion 68 contacts the upper surface of mating panel 76 substantially coincident with the contact of inner bottom surface 70 with crown 28. Those skilled in the art will understand that slight variations in this arrangement are possible while maintaining the intent and scope of the invention. Those skilled in the art will also understand that the size of the hole and mating panel 76 that receives the shoulder 24 of stud 10 is marginally greater than the largest diameter of shoulder 24. In such a manner, there is a relatively larger clearance between the aperture wall and shoulder 24 in the area of undercut 30 while maintaining a relatively minimum clearance between the aperture wall and the upper portion of shoulder 24 more proximate to crown 28.

Turning now to FIG. 5, the mating of stud 10 to mating panel 76 is complete wherein the installation punch has been forced toward installation fixture 60 with sufficient pressure that the material of mating panel 76 has flowed to contour over anti-rotation tabs 22 and come in contact with upper surface 18 of flange 16. Additionally, annular protrusion 68 by deformably bearing into the upper surface of mating panel 76 has caused the material about the periphery of shoulder 24 to flow into back angled area 30 and conform to the contour of shoulder face 34. Additionally, inner bottom surface 70 of installation punch 66 bearing against crown 28 has displaced crown 28 downward and radially outward to further engage mating panel 76.

Upon completion of the operation shown in FIG. 5, the mated panel 76 and stud 10 can be removed from the installation fixture 60 and installation punch 66. The final stud as installed is shown in FIG. 6 in partial cross-section showing the anti-rotation tab 22 extending into or above the bottom surface of mating panel 76. A recess 78 created by annular protrusion 68 is apparent in the top surface of mating panel 76 proximate to and about the periphery of crown 28. Additionally, the mating panel 76 material about the periphery of shoulder 24 has flowed into contact with shoulder face 34 and into back angled area 30 thus firmly affixing stud 10 in mating panel 76.

The flowing of the peripheral material of panel 76 into the undercut or back angled area 30 of panel 24 and also as a result of the expansion of crown 28 into interfering contact with the material of mating panel 76, the self-attaching stud can accommodate a very high push out force. Those skilled in the art will understand that by adjusting the angle, height, or diameter of shoulder 24 and thus the bearing area of shoulder face 34, the push out force of the combined panel and stud can be adjusted to meet the needs for a particular application.

Turning now to FIG. 7, an alternate embodiment stud 80 is shown having an upper non-threaded shaft 81 and a lower threaded shaft 82, thereby illustrating that the upper shaft 81 and lower shaft 82 can be configured differently depending on the requirements for a particular installation. Further, shoulder 83 is shown as a multi-sided element having a plurality of sides forming a periphery of the shoulder. In the illustrated embodiment, the shoulder is shown as an octagon, however, any multiple sided polygon can be utilized. Those skilled in the art will also readily recognize that the intersection of adjacent sides of the polygon forming shoulder 83 can also function as anti-rotation tabs and therefore eliminate the necessity to form anti-rotation tabs on the upper surface of flange 88. Stud 80 also includes a back angled area 87 and a crown area 85 to shoulder 83 wherein back angled area 87 and crown 85 are formed in a manner similar to stud 10 whereby a header tool die 46 having a nose 52 is pressed down upon a top surface of shoulder 83.

FIG. 8 shows yet another embodiment wherein stud 90 is a single ended stud having one threaded shaft 91 extending upwardly from flange 94 and shoulder 92. Shoulder 92 and anti-rotation tabs 93 are identical to shoulder 24 and anti-rotation tabs 22 as shown in stud 10 above. Stud 90 is shown to illustrate that the lower shaft can be eliminated while still incorporating the features of the instant invention on a single ended stud.

FIG. 9 illustrates an alternate punch 73 for installing stud 10 in panel 76. Punch 73 mates panel 76 to the shoulder 24 of the stud 10 in a manner identical to that of punch 66. However, punch 73 also includes an outer annular area 74 that extends downwardly from the outer periphery of punch 73. As inner bottom surface 70 and annular protrusion 68 forgingly mate shoulder 24 and panel 76, outer annular area 74 deforms panel 76 downwardly around flange 16 so that the bottom surface of flange 16 and the bottom surface of panel 76 are substantially flush.

In the foregoing description, those skilled in the art will readily appreciate that modifications may be made to the invention without departing from the concepts disclosed herein. Such modifications are to be considered as included in the following claims, unless these claims expressly state otherwise.

What is claimed is:

1. A stud for installation in a host panel and for fastening a component to the host panel, said stud comprising:

a least one shaft having a longitudinal axis;

an annular flange extending radially from said shaft at a substantially right angle with respect to said longitudinal axis;

a shoulder integral with said shaft and said flange having a diameter greater than said shaft and less than said flange including an inclined surface extending from said shaft to an outer crown defining a recess between said shank and said crown and an outer surface inclined radially outwardly from said annular flange to said crown forming an undercut; and at least one anti-rotation element intermediate said shoulder and said flange, said at least one anti-rotation element aligned for engagement with said host panel.

2. The stud according to claim 1 wherein said shoulder has a circular perimeter.

3. The stud according to claim 1 wherein said shoulder has a plurality of sides defining a polygonal perimeter.

4. The stud according to claim 3 wherein said at least one anti-rotation tab is a corner defined by two adjacent sides of said polygonal perimeter.

5. The stud according to claim 1 wherein said at least one anti-rotation tab extends from an upper surface of said annular flange.

6. The stud according to claim 1 wherein said at least one anti-rotation tab extends from a face of said shoulder.

7. A stud for installation in a panel, said stud comprising:

a shaft having a longitudinal axis;

a flange integral with and extending radially from said shaft having an annular bearing surface for supporting said panel; and a shoulder integral with said shaft and said flange having a surface inclined radially from said shaft to an outer crown defining a recess and an outer surface having a diameter greater than said shaft and less than said flange inclined from said annular bearing surface of said flange to said outer crown defining an undercut at said bearing surface of said flange.

8. The stud for installation in a panel as defined in claim 7, wherein said annular bearing surface of said flange includes a plurality of spaced radial protrusions projecting above said bearing surface having radial side surfaces.

9. The stud for installation in a panel as defined in claim 8, wherein said radial side surfaces extend generally perpendicular to said annular bearing surface.

10. The stud for installation in a panel as defined in claim 8, wherein said radial protrusions each include an inner portion integral with said outer surface of said shoulder and an outer surface spaced from an outer surface of said flange.

* * * * *